United States Patent [19]

Kitahara et al.

[11] Patent Number: 5,019,364

[45] Date of Patent: May 28, 1991

[54] METHOD FOR PURIFYING GASEOUS HYDRIDES

[75] Inventors: Koichi Kitahara; Takashi Shimada, both of Kanagawa; Keiichi Iwata, Niigata, all of Japan

[73] Assignee: Japan Pionics Co., Ltd., Tokyo, Japan

[21] Appl. No.: 611,603

[22] Filed: Nov. 13, 1990

[51] Int. Cl.$^5$ .................. B01D 53/34; C01B 3/16
[52] U.S. Cl. .................................................. 423/210
[58] Field of Search ................... 423/210, 223, 230

[56] References Cited

U.S. PATENT DOCUMENTS 4,910,001  3/1990  Kitahara et al. .................... 423/210

Primary Examiner—Michael L. Lewis
Assistant Examiner—A. Lester Burke
Attorney, Agent, or Firm—Sughrue, Mion, Zinn, Macpeak & Seas

[57] ABSTRACT

A method for purifying a gaseous hydride, which comprises bringing a crude gaseous hydride into contact with at least one material selected from copper arsenides, copper phosphides, copper silicides, copper selenides, copper borides or copper sulfides to remove oxygen contained in the crude gaseous hydride.

7 Claims, No Drawings

METHOD FOR PURIFYING GASEOUS HYDRIDES

FIELD OF THE INVENTION

This invention relates to a method for purifying gaseous hydride(s) and, more particularly, to a method for purifying gaseous hydrides which can remove oxygen contained in the gaseous hydrides as an impurity to an extremely low concentration.

BACKGROUND OF THE INVENTION

Gaseous hydrides such as arsine, phosphine, hydrogen selenide, silane, hydrogen sulfide and diborane are important as a raw material for producing a compound semiconductor such as gallium-arsenic (GaAs) or gallium-phosphorus (GaP) and an ion implantation gas, and the mount thereof used is increasing year by year. At the same time, with the increase of the integration extent of a semiconductor device, gaseous hydrides having an extremely low content of impurities have been required.

Gaseous hydrides for use in the production of semiconductors are generally commercially available as the pure gaseous hydride or in the form of being diluted with hydrogen gas or an inert gas.

These gaseous hydrides contain oxygen and moisture as impurities and of these impurities, moisture can be removed by a dehumidifying agent such as a synthetic zeolite.

The oxygen content in commercially available gaseous hydrides is usually 10 ppm or less, but, recently, gaseous hydrides contained in a bomb having a relatively low oxygen content of from 0.1 to 0.5 ppm are commercially available.

There are almost no methods for efficiently removing oxygen contained in gaseous hydrides but a method for purifying arsine by bringing a material having an adsorptive power to arsine, such as active carbon or a synthetic zeolite, into contact with arsine to reduce the oxygen content to 1 ppm or less is proposed in, for example, JP-A-62-78116 (the term "JP-A" as used herein refers to a "published unexamined Japanese patent application").

However, gaseous hydrides having an oxygen content to an extent of slightly below 1 ppm cannot sufficiently meet the requirement in a recent semiconductor production process and it has strongly been desired to reduce the oxygen content in gaseous hydrides to 0.1 ppm or less.

Further, since such gaseous hydrides are sometimes contaminated by the entrance of impurities such as air in supplying steps to an apparatus for producing semiconductors such as a step of connecting a gaseous hydride bomb to the apparatus or a step of changing pipes, it is desired to finally remove impurities immediately before the apparatus.

On the other hand, a method for removing oxygen contained in a crude gaseous hydride has been proposed, which comprises bringing the crude gaseous hydride into contact with at least one of nickel arsenides, nickel phosphides, nickel silicides, nickel selenides and nickel borides, as described in U.S. patent application Ser. No. 07/421,750 filed Sept. 26, 1989. This method can efficiently remove oxygen to a concentration of 0.01 ppm or less.

However, it has been found that in the case of using the above-described nickel compounds, part of the gaseous hydrides is captured by those compounds at the initial stage of gas flowing, and the gas concentration at outlet lowers at the initial stage of purification, depending on the conditions.

Therefore, if the amount of flow of the gas is large, the gas concentration at outlet reaches the desired concentration within a relatively short period of time and thus, there is no particular problem. However, if the amount of flow of the gas is small, e.g., about 1 cm/sec in terms of a linear velocity (LV), there is the problem that a substitution of the gas is required for a long period of time until initiating to feed the gas to a process.

Further, in the semiconductor production step, when a one-day work is completed, the feed lines of gas are generally replaced by an inert gas such as nitrogen gas and left as it is to the next day, and the type of the gas is often changed during the operation of apparatus.

Therefore, it is demanded by semiconductor manufactures that impurities contained in the gaseous hydrides should be efficiently removed, and at the same time, the time required to reach the gas concentration to the desired concentration should be within at least 1 hour and preferably within 30 minutes from the initiation of flowing the gas.

SUMMARY OF THE INVENTION

As the result of serious investigations for efficiently removing oxygen contained in gaseous hydrides to an extremely low concentration, it has been found that the oxygen concentration can be reduced to 0.1 ppm or less and, as the case may be, 0.01 ppm or less by bringing the gaseous hydrides into contact with an arsenide, a phosphide, etc., of copper, and the gaseous hydride concentration at outlet of the purification pipe can reach the desired concentration within a short period of time even in a low linear velocity of the gas. The present invention is accomplished based on this finding.

Accordingly, an object of this invention is to provide a method for purifying gaseous hydrides, which can remove oxygen contained in the gaseous hydrides as an impurity to an extremely low concentration.

The method for purifying gaseous hydrides according to this invention comprises bringing crude gaseous hydrides into contact with at least one member selected from the group consisting of copper arsenides, copper phosphides, copper silicides, copper selenides, copper borides and copper sulfides to remove oxygen contained in the crude gaseous hydrides.

DETAILED DESCRIPTION OF THE INVENTION

This invention is applied to remove oxygen as an impurity contained in a gaseous hydride itself or a gaseous hydride diluted with hydrogen gas (hydrogen gas base) or an inert gas (inert gas base) such as nitrogen or argon (hereinafter, these gaseous hydrides are referred to as "crude gaseous hydrides").

A gaseous hydride which is purified in this invention is a gaseous hydride such as arsine, phosphine, hydrogen selenide, siliane, hydrogen sulfide or diborane which is mainly used for the production of semiconductors.

The copper arsenides, copper phosphides, copper silicides, copper selenides, copper borides and copper sulfides (hereinafter referred to as "copper A-ide") used in this invention are $Cu_3As$, $Cu_5As_2$, $Cu_3P$, $Cu_3P_2$, $Cu_4Si$, $Cu_5Si$, $Cu_3Si$, $Cu_2Se$, $CuSe$, $Cu_3B_2$, $Cu_2S$ and CuS, which are generally known as copper compounds, as well as various compounds formed by combining copper and arsenic, phosphorous, silicon, selenium, boron or sulfur (hereinafter, such as element is referred to as "element A") in other forms.

Copper A-ide can be obtained by various methods. In these methods, an example of a simple method is a method where the copper A-ide can be easily obtained by bringing copper into contact with at least one of the gaseous hydrides such as arsine and phosphine.

In this case, the copper which is used to form the copper A-ide is metallic copper or a compound mainly composed of a copper compound which is easily reduced, such as a copper oxide.

Further, such copper may contain small amounts of other metal components than copper, such as chromium, iron and cobalt.

The copper can be used alone or in a form that the copper is supported by a catalyst carrier, but for the purpose of increasing the contact efficiency between the surface of the copper and the gas, the form that the copper is supported by a catalyst carrier is generally preferred.

Oxides of copper can be obtained by various methods. For example, the copper oxides are obtained by a method comprising adding an alkali such as sodium hydroxide, potassium hydroxide, sodium carbonate or ammonia to nitrides, sulfates, chlorides, organic acid salts, etc. of copper to precipitate intermediates of the oxides, and calcining the precipitates.

The copper oxide is usually formed into moldings by extrusion molding, tablet molding, etc., and the moldings are used as they are or after being ground into proper sizes. As the molding method, a drying method or a wet method can be used, and in this case, a small amount of water, a lubricant, etc., may be used.

Further, various commercially available copper oxide catalysts can be used, and a suitable copper oxide can be selected therefrom and used in the present invention.

It is important that a catalyst wherein reduced copper, copper oxide, etc., is finely dispersed and having a large surface area giving high contact efficiency with the gas is used.

The specific surface area of the catalyst is in the range of generally from 10 to 300 m$^2$/g, and preferably from 30 to 250 m$^2$/g, as a value measured by the BET method.

The content of copper in the catalyst is generally from 5 to 95% by weight, preferably from 20 to 95% by weight, and more preferably from 50 to 95% by weight, calculated as metallic copper.

If the copper content is less than 5% by weight, the deoxidation ability becomes low, while if the copper content is higher than 95% by weight, there is a possibility of causing sintering at the reduction by hydrogen to reduce the activity of the catalyst.

The A-ation of copper to form copper A-ide can be carried out by bringing a gaseous hydride into contact with copper, copper oxide, etc., and in the case of using copper oxide, etc., it is preferred to previously reduce the same by hydrogen reduction to form reduced copper.

The hydrogen reduction of copper oxide can be carried out by passing a mixed gas of hydrogen and nitrogen through a column containing copper oxide at a linear velocity (LV) of about 1 cm/sec. and at a temperature of about 350° C. or lower. In this case, since the reaction is an exothermic reaction, it is required to control the system such that the temperature of the system does not increase rapidly. Further, when the reduction is carried out using hydrogen-base gaseous hydride, the A-action simultaneously occurs and hence this embodiment is convenient.

The A-ation is generally carried out by packing a pipe such as a purification pipe, etc., with copper or copper oxide and passing therethrough a gaseous hydride or a gas containing a gaseous hydride.

The concentration of the gaseous hydride used in the A-ation is generally at least 0.1% by volume, and preferably at least 1% by volume. If the gaseous hydride concentration is less than 0.1% by volume, the time required to complete the reaction becomes uneconomically long.

The A-ation can be carried out at room temperature (e.g., 15°-30° C.), but since the reaction is an exothermic reaction as described above and also as the gaseous hydride concentration increases, the temperature tends to become higher. Therefore, it is preferred to control the flow rate of the gaseous hydride so that the temperature is kept 250° C. or less, and preferably 200° C. or less.

The completion of the A-ation reaction can be determined by the decrease of the amount of heat generated or the increase of the discharging amount of the gaseous hydride from the outlet of a pipe.

The copper A-ide obtained by the A-ation of copper may then be filled in another purification pipe, and a crude gaseous hydride is passed therethrough to remove oxygen gas contained in the crude gaseous hydride. However, since the copper A-ide has generally a strong toxicity and, hence, must be handled with great care, it is preferred that the A-ation is, from the first, carried out in a purification pipe for a crude gaseous hydride gas to form the copper A-ide and after completion of the reaction, a crude gaseous hydride to be purified is supplied into the purification pipe containing the copper A-ide to remove oxygen therefrom.

The purification of a crude gaseous hydride is generally carried out by passing the crude gaseous hydride through a purification pipe packed with the copper A-ide, and oxygen contained in the crude gaseous hydride as an impurity is removed therefrom by bringing the crude gaseous hydride into contact with the copper A-ide.

The oxygen concentration in the crude gaseous hydride to be purified by the method of this invention is generally 100 ppm or less. If the oxygen concentration is higher than 100 ppm, the amount of heat generated in the purification step is increased and hence a means for removing heat is required according to the conditions for the purification.

The length of the packed column of the copper A-ide packed in the purification pipe is generally from 50 to 1,500 mm from the practical standpoint. If the length of the packed column is shorter than 50 mm, the oxygen removing rate tends to reduce and if the packed length is longer than 1,500 mm, the pressure loss tends to become large.

The linear velocity (LV) of the crude gaseous hydride in pipe at the purification depends upon the type and oxygen concentration of the crude gaseous hydride supplied and the operation condition of the purification step, but is generally 100 cm/sec. or less, and preferably 30 cm/sec. or less.

The contact temperature of the gaseous hydride and the copper A-ide is about 200° C. or less, and preferably from 0 to 100° C. as the temperature of the gas supplied to the inlet of the purification pipe, and is generally room temperature without need of particular heating or cooling.

There is no particular restriction on the pressure and the purification can be carried out at atmospheric pressure, reduced pressure, or under pressure. However, the pressure is usually 20 kg/cm² abs. or less, and preferably from 0.1 to 10 kg/cm² abs.

The existence of a small amount of moisture in the crude gaseous hydride to be purified does not give a harmful influence on the deoxidation ability of the copper A-ide and furthermore, when a carrier, etc., is used for the catalyst, moisture is simultaneously removed according to the nature of the carrier.

In this invention, a moisture removing step by a dehumidifying agent such as synthetic zeolite can be properly employed, if desired and necessary, in the oxygen removing step by the copper A-ide, whereby moisture can be completely removed and the purified gaseous hydride having a very high purity can be obtained.

According to the method of this invention, oxygen in a crude gaseous hydride can be removed to a very low concentration of 0.1 ppm or less, or further 0.01 ppm or less, which has hitherto been difficult in conventional techniques, and purified gaseous hydride having a very high purity, which has been desired in semiconductor producing industries, etc., can be obtained.

Further, since the purified gas concentration at outlet of the purification pipe reaches the desired concentration within a short period of time from the initiation of flowing the crude gaseous hydride into the purification pipe, a purified gas having a high purity can efficiently fed to the semiconductor production step.

This invention is further described in more detail by reference to the following examples, which should not be construed to limit the scope of the invention.

EXAMPLE 1

Preparation of Copper Oxide Catalyst 20 wt % of a sodium carbonate aqueous solution was added to 20 wt % of a copper sulfate until the pH of the resulting mixed solution became 9-10, to precipitate crystals of basic copper carbonate. The crystals were filtered and washed repeatedly, dried at 130° C. in air stream, and then calcined at 300° C. to obtain copper oxide.

Alumina sol ("Cataloid AS-2", manufactured by Shokubai Chemical Industry) was added to the copper oxide obtained above, and kneaded with a kneader. The resulting mixture was dried at 130° C. in air and calcined at 350° C. The calcined product was ground into particles. The particles were molded into cylindrical pellets having a diameter of 6 mm and a height of 4 mm by tablet molding.

The pellets were ground into particles, and the particles were sieved to collect particles having a particle size of 6-12 mesh. 85 ml (136 g) of the particles thus collected were packed in a quartz purification pipe having an inner diameter of 19 mm and a length of 400 mm (packed density: 1.6 g/ml).

Formation of Copper A-ide

Through the purification pipe was passed nitrogen gas containing a gaseous hydride for forming the copper A-ide in an amount of 10% by volume in the case of arsine, phosphine, silane or hydrogen sulfide for 3 hours, or hydrogen gas containing 3% by volume in the case of hydrogen selenide or diborane for 8 hours, at a flow rate of 510 cc/min. (LV: 3 cm/sec.) to form the copper A-ide.

In this case, the room temperature was 25° C. but the temperature of the gas at the outlet of the pipe was raised to a range of from 35° to 85° C. by the reaction heat in the formation of the copper A-ide, although the temperature differed according to the kind of the gaseous hydride. Thereafter, the temperature of the gas at the outlet gradually lowered and became room temperature after 3 to 8 hours, thereby obtaining the copper A-ide.

The pipe containing the product was purged as it was by hydrogen gas for 3 hours for the purification of the crude gaseous hydride.

36 purification pipes for 6 kinds of the copper A-ide, 6 pipes for each kind of the copper A-ide, were prepared.

Purification of Gaseous Hydride

Each gaseous hydride was purified. When through the purification pipe containing the copper A-ide there was passed hydrogen-base arsine, phosphine, silane, hydrogen selenide, diborane or hydrogen sulfide containing oxygen as an impurity at a flow rate of 1,700 cc/min. (LV: 10 cm/sec.) and when the oxygen concentration in the gas at the outlet of the pipe was measured using a white phosphorous emission type oxygen analyzer (the lower limit of the measurable concentration was 0.01 ppm), oxygen was not detected, which showed that the oxygen content was below 0.01 ppm. Even after 100 minutes since the initiation of the purification, the oxygen concentration in the gas at the outlet was also below 0.01 ppm.

The results obtained are shown in Table 1 below.

When the gaseous hydride concentration in the gas at the outlet of the pipe was measured with a gas chromatography, the concentration reached the gaseous hydride concentration in the gas at the inlet of the pipe within 5 minutes after initiation of flowing the gas in each case. Measurement was further continued for 100 minutes, but no change in the concentration was observed.

TABLE 1

| Run No. | Copper A-ide | Gas to Be Treated | Concentration of Gas (vol %) | $O_2$ Concentration at Inlet (ppm) | $O_2$ Concentration at Outlet (ppm) |
|---|---|---|---|---|---|
| 1 | CuAs | Arsine | 10 | 0.12 | 0.01 or less |
| 2 | " | Phosphine | 10 | 0.08 | " |
| 3 | " | Silane | 3 | 0.50 | " |
| 4 | " | Hydrogen Selenide | 10 | 0.15 | " |
| 5 | " | Diborane | 2.5 | 0.05 | " |
| 6 | " | Hydrogen Sulfide | 10 | 0.50 | " |
| 7 | CuP | Arsine | 10 | 0.12 | " |
| 8 | " | Phosphine | 10 | 0.08 | " |
| 9 | " | Silane | 3 | 0.50 | " |
| 10 | " | Hydrogen Selenide | 10 | 0.15 | " |
| 11 | " | Diborane | 2.5 | 0.05 | " |
| 12 | " | Hydrogen Sulfide | 10 | 0.50 | " |
| 13 | CuSi | Arsine | 10 | 0.12 | " |
| 14 | " | Phosphine | 10 | 0.08 | " |
| 15 | " | Silane | 3 | 0.50 | " |
| 16 | " | Hydrogen Selenide | 10 | 0.15 | " |

TABLE 1-continued

| Run No. | Copper A-ide | Gas to Be Treated | Concentration of Gas (vol %) | O₂ Concentration at Inlet (ppm) | O₂ Concentration at Outlet (ppm) |
|---|---|---|---|---|---|
| 17 | " | Diborane | 2.5 | 0.05 | " |
| 18 | " | Hydrogen Sulfide | 10 | 0.50 | " |
| 19 | CuSe | Arsine | 10 | 0.12 | 0.01 or less |
| 20 | " | Phosphine | 10 | 0.08 | " |
| 21 | " | Silane | 3 | 0.50 | " |
| 22 | " | Hydrogen Selenide | 10 | 0.15 | " |
| 23 | " | Diborane | 2.5 | 0.05 | " |
| 24 | " | Hydrogen Sulfide | 10 | 0.50 | " |
| 25 | CuB | Arsine | 10 | 0.12 | " |
| 26 | " | Phosphine | 10 | 0.08 | " |
| 27 | " | Silane | 3 | 0.50 | " |
| 28 | " | Hydrogen Selenide | 10 | 0.15 | " |
| 29 | " | Diborane | 2.5 | 0.05 | " |
| 30 | " | Hydrogen Sulfide | 10 | 0.50 | " |
| 31 | CuS | Arsine | 10 | 0.12 | " |
| 32 | " | Phosphine | 10 | 0.08 | " |
| 33 | " | Silane | 3 | 0.50 | " |
| 34 | " | Hydrogen Selenide | 10 | 0.15 | " |
| 35 | " | Diborane | 2.5 | 0.05 | " |
| 36 | " | Hydrogen Sulfide | 10 | 0.50 | " |

EXAMPLE 2

Fresh 36 purification pipes were prepared in the same manner as in Example 1, and the same crude gaseous hydride as used in Example 1 was passed therethrough at a low flow rate of 85 cc/mim (LV=0.5 cm/sec.). When the gaseous hydride concentration in the gas at the outlet of the pipe was measured, the concentration ratio of the outlet concentration to the inlet concentration reached 99% or more within 20–36 minutes.

The results obtained are shown in Table 3 below.

EXAMPLE 3

A commercially available copper oxide catalyst (G108, made by Nissan Girdler Catalyst Co.) was used. This catalyst had $SiO_2$ as a carrier, contained 30 wt % of CuO (calculated as Cu), and was a molded product having a diameter of 5 mm and a height of 4.5 mm.

The copper oxide catalyst was ground into particles of 8–10 mesh, and 85 ml of the particles were packed in a quartz purification pipe having an inner diameter of 19 mm and a lengths of 400 mm at a packed length of 300 mm (packed density: 1.0 g/ml).

Formation of Copper A-ide

Through the purification pipe was passed nitrogen gas containing a gaseous hydride for forming the copper A-ide in an amount of 10% by volume in the case of arsine, phosphine, silane or hydrogen sulfide for 3 hours, or hydrogen gas containing 3% by volume in the case of hydrogen selenide or diborane for 8 hours, at a flow rate of 510 cc/min. (LV: 3 cm/sec.) to form the copper A-ide.

36 purification pipes for 6 kinds of the copper A-ide, 6 pipes for each kind of the copper A-ide, were prepared.

Purification of Gaseous Hydride

Each gaseous hydride was purified. When through the purification pipe containing the copper A-ide there was passed nitrogen-base arsine, phosphine, silane, hydrogen selenide, diborane or hydrogen sulfide containing oxygen as an impurity at a flow rate of 1,700 cc/min. (LV: 10 cm/sec.) and when the oxygen concentration in the gas at the outlet of the pipe was measured using a white phosphorous emission type oxygen analyzer (the lower limit of the measurable concentration was 0.01 ppm), oxygen was not detected which showed that the oxygen content was below 0.01 ppm. Even after 100 minutes since the initiation of the purification, the oxygen concentration in the gas at the outlet was also below 0.01 ppm.

The results obtained are shown in Table 2 below.

When the gaseous hydride concentration in the gas at the outlet of the pipe was measured with a gas chromatography, the concentration reached the gaseous hydride concentration in the gas at the inlet of the pipe within 5 minutes after initiation of flowing the gas in each case. Measurement was further continued for 100 minutes, but no change in the concentration was observed.

TABLE 2

| Run No. | Copper A-ide | Gas to Be Treated | Concentration of Gas (vol %) | O₂ Concentration at Inlet (ppm) | O₂ Concentration at Outlet (ppm) |
|---|---|---|---|---|---|
| 1 | CuAs | Arsine | 10 | 0.12 | 0.01 or less |
| 2 | " | Phosphine | 10 | 0.08 | " |
| 3 | " | Silane | 3 | 0.50 | " |
| 4 | " | Hydrogen Selenide | 10 | 0.15 | " |
| 5 | " | Diborane | 2.5 | 0.05 | " |
| 6 | " | Hydrogen Sulfide | 10 | 0.50 | " |
| 7 | CuP | Arsine | 10 | 0.12 | " |
| 8 | " | Phosphine | 10 | 0.08 | " |
| 9 | " | Silane | 3 | 0.50 | " |
| 10 | " | Hydrogen Selenide | 10 | 0.15 | " |
| 11 | " | Diborane | 2.5 | 0.05 | " |
| 12 | " | Hydrogen Sulfide | 10 | 0.50 | " |
| 13 | CuSi | Arsine | 10 | 0.12 | " |
| 14 | " | Phosphine | 10 | 0.08 | " |
| 15 | " | Silane | 3 | 0.50 | " |
| 16 | " | Hydrogen Selenide | 10 | 0.15 | " |
| 17 | " | Diborane | 2.5 | 0.05 | " |
| 18 | " | Hydrogen Sulfide | 10 | 0.50 | " |
| 19 | CuSe | Arsine | 10 | 0.12 | " |
| 20 | " | Phosphine | 10 | 0.08 | 0.01 or less |
| 21 | " | Silane | 3 | 0.50 | " |
| 22 | " | Hydrogen Selenide | 10 | 0.15 | " |
| 23 | " | Diborane | 2.5 | 0.05 | " |
| 24 | " | Hydrogen Sulfide | 10 | 0.50 | " |
| 25 | CuB | Arsine | 10 | 0.12 | " |
| 26 | " | Phosphine | 10 | 0.08 | " |
| 27 | " | Silane | 3 | 0.50 | " |
| 28 | " | Hydrogen Selenide | 10 | 0.15 | " |
| 29 | " | Diborane | 2.5 | 0.05 | " |
| 30 | " | Hydrogen Sulfide | 10 | 0.50 | " |
| 31 | CuS | Arsine | 10 | 0.12 | " |
| 32 | " | Phosphine | 10 | 0.08 | " |
| 33 | " | Silane | 3 | 0.50 | " |
| 34 | " | Hydrogen Selenide | 10 | 0.15 | " |
| 35 | " | Diborane | 2.5 | 0.05 | " |
| 36 | " | Hydrogen Sulfide | 10 | 0.50 | " |

EXAMPLE 4

Fresh 36 purification pies were prepared in the same manner as in Example 3, and the same crude gaseous hydride as used in Example 3 was passed therethrough at a low flow rate of 85 cc/mim (LV=0.5 cm/sec.). When the gaseous hydride concentration in the gas at the outlet of the pipe was measured, the concentration ratio of the outlet concentration to the inlet concentration reached 99% or more within 20-35 minutes.

The results obtained are shown in Table 3 below.

COMPARATIVE EXAMPLE 1

A commercially available nickel catalyst (N-111, trade name, made by JGC Corporation) was used. The composition of the catalyst was in the form of Ni+NiO, containing 45 to 47% by weight of Ni, 2 to 3% by weight of Cr, 2 to 3% by weight of Cu, 27 to 29% by weight of diatomaceous earth and 4 to 5% by weight of graphite, and was a molding having a diameter of 5 mm and a height of 4.5 mm.

The nickel catalyst was ground into particles of 8 to 10 mesh and 85 ml of the particles were packed in a quartz purification pipe having an inside diameter of 19 mm and a length of 400 mm at a packed length of 300 mm (packed density 1.0 g/ml).

After reducing the nickel catalyst by passing therethrough hydrogen gas at temperature of 150° C. and a flow rate of 595 cc/min. (LV: 3.6 cm/sec.) for 3 hours, the reduced nickel was cooled to room temperature.

Formation of Nickel A-ide

Through the purification pipe containing reduced nickel was passed hydrogen gas containing a gaseous hydride for forming the nickel A-ide in an amount of 10% by volume in the case of arsine, phosphine, silane or hydrogen sulfide for 3 hours, 3% by volume in the case of hydrogen selenide for 3-8 hours, or 2.5% by volume in the case of diborane for 3-8 hours, at a flow rate of 510 cc/min. (LV: 3 cm/sec.) to form the nickel A-ide.

36 purification pipes for 6 kinds of the nickel A-ide, 6 pipes for each kind of the nickel A-ide, were prepared.

Purification of Gaseous Hydride

Each gaseous hydride was purified. When through the purification pipe containing the nickel A-ide there was passed hydrogen-base arsine, phosphine, silane, hydrogen selenide, diborane or hydrogen sulfide containing oxygen as an impurity at a flow rate of 1,700 cc/min. (LV: 10 cm/sec.) and when the oxygen concentration in the gas at the outlet of the pipe was measured using a white phosphorous emission type oxygen analyzer (the lower limit of the measurable concentration was 0.01 ppm), oxygen was not detected which showed that the oxygen content was below 0.01 ppm.

When the gaseous hydride concentration in the gas at the outlet of the pipe was measured by a gas chromatography, the concentration reached the same concentration of the gaseous hydride in the gas at the inlet within 5 minutes after flowing the gas in each case. Measurement was further continued for 100 minutes, but no change in the concentration was observed.

Fresh 36 purification pipes were prepared in same manner as above, and the same crude gaseous hydride as used above was passed therethrough at a low flow rate of 85 cc/min (LV=0.5 cm/sec.). When the gaseous hydride concentration in the gas at the outlet of the pipe was measured, the time to reach the concentration ratio of the outlet concentration to the inlet concentration of 99% or more required 40 to 120 minutes, or in same case longer than 120 minutes.

The results obtained are shown in Table 3 1 below.

TABLE 3

| | | | Time to reach 99% Concentration ratio min. | | |
|---|---|---|---|---|---|
| Run No. | Cu (or Ni) A-ide | Gas to be treated | Example 2 (CuA) | Example 4 (CuA) | Comparative Example 1 (NiA) |
| 1 | Cu(Ni)As | Arsine | 16 | 22 | 40 |
| 2 | " | Phosphine | 22 | 23 | 48 |
| 3 | " | Silane | 20 | 19 | 50 |
| 4 | " | Hydrogen Selenide | 29 | 28 | 86 |
| 5 | " | Diborane | 26 | 26 | 51 |
| 6 | " | Hydrogen Sulfide | 32 | 35 | 88 |
| 7 | Cu(Ni)P | Arsine | 21 | 21 | 105 |
| 8 | " | Phosphine | 33 | 21 | 90 |
| 9 | " | Silane | 24 | 26 | 115 |
| 10 | " | Hydrogen Selenide | 32 | 33 | >120 |
| 11 | " | Diborane | 24 | 24 | 105 |
| 12 | " | Hydrogen Sulfide | 30 | 36 | >120 |
| 13 | Cu(NI)Si | Arsine | 23 | 24 | 70 |
| 14 | " | Phosphine | 23 | 26 | 64 |
| 15 | " | Silane | 16 | 20 | 58 |
| 16 | " | Hydrogen Selenide | 34 | 33 | 74 |
| 17 | " | Diborane | 19 | 24 | 75 |
| 18 | " | Hydrogen Sulfide | 36 | 32 | 105 |
| 19 | Cu(Ni)Se | Arsine | 26 | 25 | >120 |
| 20 | " | Phosphine | 23 | 26 | >120 |
| 21 | " | Silane | 25 | 23 | >120 |
| 22 | " | Hydrogen Selenide | 26 | 24 | >120 |
| 23 | " | Diborane | 26 | 26 | >120 |
| 24 | " | Hydrogen | 28 | 30 | >120 |

TABLE 3-continued

| Run No. | Cu (or Ni) A-ide | Gas to be treated | Time to reach 99% Concentration ratio min. | | |
|---|---|---|---|---|---|
| | | | Example 2 (CuA) | Example 4 (CuA) | Comparative Example 1 (NiA) |
| 25 | Cu(Ni)B | Arsine | 28 | 26 | 86 |
| 26 | " | Phosphine | 29 | 30 | 75 |
| 27 | " | Silane | 21 | 24 | 63 |
| 28 | " | Hydrogen Selenide | 32 | 33 | 104 |
| 29 | " | Diborane | 23 | 22 | 79 |
| 30 | " | Hydrogen Sulfide | 33 | 32 | 115 |
| 31 | Cu(Ni)S | Arsine | 26 | 28 | >120 |
| 32 | " | Phosphine | 28 | 33 | >120 |
| 33 | " | Silane | 26 | 25 | >120 |
| 34 | " | Hydrogen Selenide | 25 | 26 | >120 |
| 35 | " | Diborane | 25 | 24 | >120 |
| 36 | " | Hydrogen Sulfide | 28 | 26 | 115 |

COMPARATIVE EXAMPLE 2

Active carbon (coconut shell carbon) was ground into pieces of 8 to 24 mesh, and 48 g of the ground active carbon was packed in the same type of purification pipe as used in Example 1 in a packed height of 300 mm (packed density 0.57 g/ml). The packed active carbon was heat-treated in a helium gas stream at a temperature of from 270° to 290° C. for 4 hours, and the pipe was cooled to room temperature.

When the hydrogen-based crude arsine containing 10% of arsine and 0.12 ppm of oxygen as an impurity as used in Example 1 was passed through the purification pipe at a flow rate of 1,700 cc/mim (LV=10 cm/sec.) and the oxygen concentration in the gas at the outlet was measured, the oxygen concentration was 0.12 ppm. When the gas was passed in the same state for further 2 hours, no change was observed.

While the invention has been described in detail and with reference to specific embodiments thereof, it will be apparent to one skilled in the art that various changes and modifications can be made therein without departing from the spirit and scope thereof.

What is claimed is:

1. A method for purifying a gaseous hydride, which comprises bringing a crude gaseous hydride into contact with at least one member selected from the group consisting of copper arsenides, copper phosphides, copper silicides, copper selenides, copper borides and copper sulfides to remove oxygen contained in the crude gaseous hydride wherein the gaseous hydrides are present in a concentration of at least 0.1% by volume.

2. The method as claimed in claim 1, wherein the crude gaseous hydride is at least one selected from the group consisting of arsine, phosphine, silane, hydrogen selenide, diborane and hydrogen sulfide.

3. The method as claimed in claim 2, wherein the crude gaseous hydride is diluted with hydrogen gas or an inert gas.

4. The method as claimed in claim 1, wherein the copper arsenides, copper phosphides, copper silicides, copper selenides, copper borides and copper sulfides are obtained by bringing copper into contact with arsine, phosphine, silane, hydrogen selenide, diborane and hydrogen sulfide, respectively.

5. The method as claimed in claim 1, wherein the contact of the crude gaseous hydride with copper arsenides, copper phosphides, copper silicides, copper selenides, copper borides or copper sulfides for removing oxygen contained therein is carried out by packing copper in a purification pipe, passing a gaseous hydride therethrough to form copper arsenides, copper phosphides, copper silicides, copper selenides, copper borides or copper sulfides, and then passing the crude gaseous hydride through the purification pipe.

6. The method as claimed in claim 5, wherein the copper packed in the purification pipe is supported by a catalyst carrier, the specific area of the whole catalyst is in the range of from 10 to 300 m²/g, and the content of copper is in the range of from 5 to 95% by weight, calculated as metallic copper.

7. The method as claimed in claim 5, wherein the flow rate of the crude gaseous hydride passing through the purification pipe is 100 cm/sec. or less and the temperature of the gas at the inlet of the purification pipe is 200° C. or less.

* * * * *